United States Patent

Ming-Ji

[11] Patent Number: 5,155,400
[45] Date of Patent: Oct. 13, 1992

[54] DISPLACEMENT CONTROL MOTOR

[76] Inventor: Lee Ming-Ji, 2nd Fl. 133, Long Men Rd., San Chung City, Taipei County, Taiwan

[21] Appl. No.: 769,211

[22] Filed: Oct. 1, 1991

[51] Int. Cl.⁵ .................. H02K 11/00; F16H 35/00
[52] U.S. Cl. .................................. 310/68 E; 310/83; 74/384
[58] Field of Search ............... 310/68 E, 80, 83, 81; 74/384, 411; 475/263

[56] References Cited

U.S. PATENT DOCUMENTS

| | | | |
|---|---|---|---|
| 4,219,764 | 8/1980 | Terada et al. | 318/48 |
| 4,631,460 | 12/1986 | Reichmann | 318/280 |
| 4,752,706 | 6/1988 | Meszaros | 310/80 |

FOREIGN PATENT DOCUMENTS 606024  4/1978  U.S.S.R. .................................. 74/384

Primary Examiner—Steven L. Stephan
Assistant Examiner—Matt Nguyen
Attorney, Agent, or Firm—Bacon & Thomas

[57] ABSTRACT

A displacement control motor provided with a continuously rotary shaft and a reel capable of changing deflection angle according to the rotary speed of the motor whereby other articles can be carried, driven, or controlled via the reel; the motor including a concealed motor, a driving gear, a driven gear, a reel shaft seat and a load device, wherein the rotary shaft is connecded with the driving gear while the driven gear meshes with the driving gear, the driving and driven gears being both pivoted to the shaft seat and the driven gear being linked with the load device, whereby the rotary shafts of the driving and driven gears are located on the same shaft seat and the driven gear is additionally loaded by the load device and a balance spring is used to restrict the displacement of the driven gear so that by means of the change of rotary speed of the rotary shaft, the deflection magnitude of the reel can be controlled.

3 Claims, 2 Drawing Sheets

DISPLACEMENT CONTROL MOTOR

BACKGROUND OF THE INVENTION

The present invention relates to a displacement control motor including a main body containing a driving gear and a driven gear driven by a motor. Both gears are pivoted on the same shaft seat. The control of the deflection of the shaft seat is achieved by means of changing of the rotary speed of the rotary shaft via variable loading on the driven gear. At the same time, the motor is kept rotated.

A conventional so-called step motor is able to perform the function of displacement. However, such motor includes considerable amount of coil components so as to attain the above function of displacement and match with the number of the external control pulse signal to produce the displacement by specific angle. The step motor is mainly used in the printer of a computer.

However, the design of the above step motor is complex and sophisticated in the structure, and the control mechanism and wiring are also complex in order to produce multiple control pulses and sequence control. This results in higher production cost and is not suitable to other applications in which only simpler displacement is required. In brief, the conventional step motor appears to be not economical.

Apart from the above described step motor, a servomechanism, such as the steering mechanism of general toy cars, is also utilized to control the displacement. Generally, the toy car still requires one set of movement power mechanism to make the toy car drive. However, in view of the complicated power mechanism and the servo, it is apparent that the entire mechanism shall not only occupy large space but also causes the difficulty in maintaining the precision driving mechanism and the servo while higher energy is consumed.

Therefore, it is hardly considered a simple and convenient design to use the above described servo to control the change of displacement. In other words, it presents the same defect as that shown in the above-mentioned step motor. It is therefore tried by the applicant to develop a simplified displacement control motor to eliminate the above shortcomings existing in the conventional means.

SUMMARY OF THE INVENTION

The simplified displacement control motor provided by the applicant may be used to control the angle and magnitude of the deflection of the rotary reel simply by controlling the rotary speed of the motor. The present invention uses only a motor to supply the power it requires, and is comprised of a driving gear, a driven gear, a rotary shaft, a rotary shaft seat, and a load device. When a DC motor is used, the internal structure and the control circuit can be further simplified while a simpler displacement control effect is provided to suitable to the displacement requirement of lower level products, such as toy cars, tachometers, etc.

Other objects of the present invention will become obvious from the following detailed description taken in conjunction with the accompanying drawings, wherein like reference numerals indicate like parts throughout the whole description and:

DETAILED DESCRIPTION OF THE PREFERRED EMBODIMENT

Figure 1A:
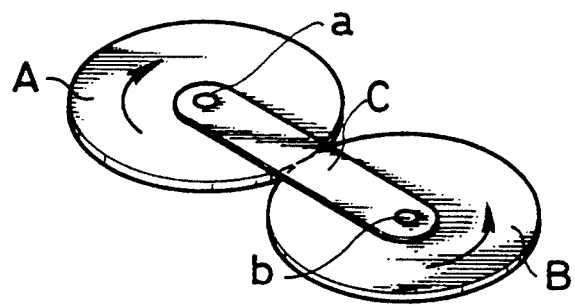
FIG. 1A is a three-dimensional view showing the principle of the meshing of the gears of the present invention.
Figure 1B:
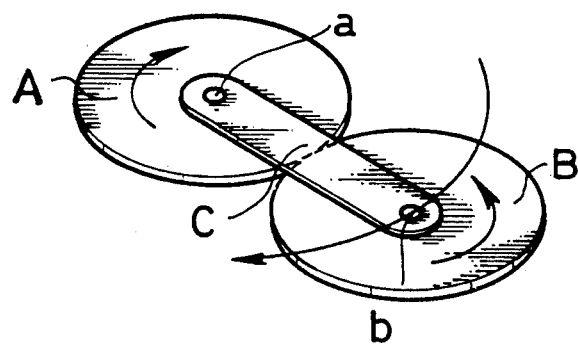
FIG. 1B is a three-dimensional view showing the principle of the deflection of the present invention.

Please first refer to FIG. 1A. The deflection of the present invention is achieved in such a manner that a driving gear A is engaged with a driven gear B and spindles a, b of the gears A, B, respectively, are pivoted to each other by a link C so that when the driving gear A is urged to rotate clockwise, the driven gear B is driven to rotate counter-clockwise. However, if the driven gear B is rotated against a large resistance or is stopped by other elements, i.e., the load on the driven gear B is increased, then the link C will be deflected clockwise about the spindle a of the driving gear A, as shown in FIG. 1B. The magnitude of deflection of the link C is determined by the rotation resistance against the driven gear B. The larger the rotation resistance is, the larger the deflection magnitude of the link C is, i.e., the increased load is in proportion to the deflection magnitude.

Figure 1C:
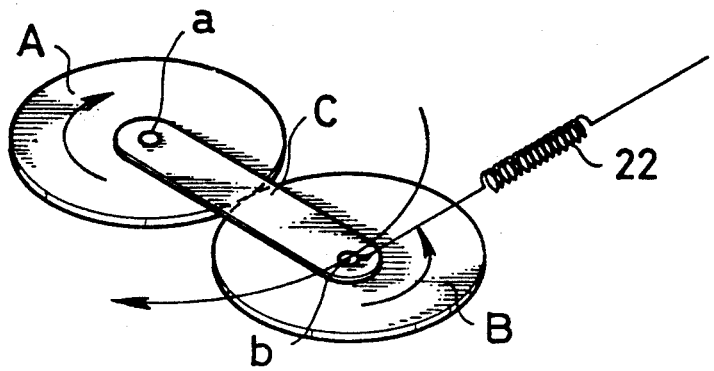
FIG. 1C is a three-dimensional view showing the deflection of the present invention when a balance spring is incorporated.

A balance spring 22 is connected with the link C adjacent to the driven gear B, as shown in FIG. 1C. By this way, the link C can be deflected in a resilient and balance manner. The change of the loading state of the driven gear B as mentioned above can be accomplished directly by the centrifugal variance formed due to the high and low rotary speeds of the driven gear B, i.e., when changing the rotary speed of the driving spindle a, the deflection magnitude of the link C is relatively changed, and keeps balance with the spring force under different spring extension magnitudes.

Figure 2:
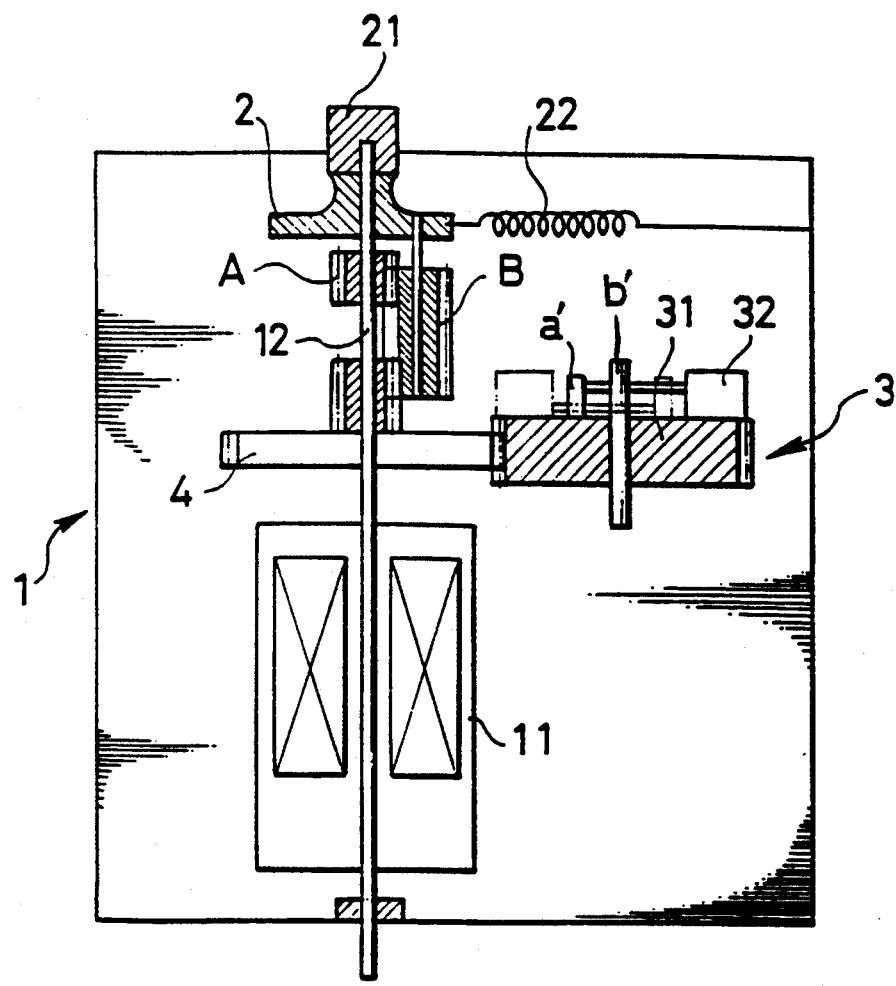
FIG. 2 is a plan view showing the structure of an embodiment of the present invention.

According to the above deflection principle, the displacement control motor of the present invention is designed as shown in FIG. 2, wherein all the elements are disposed in a main body 1, and a motor 11 serves as a power source. The rotary shaft 12 of the motor 11 penetrates toward an upper and lower positions. A portion of the rotary shaft 12 protruding outside the bottom of main body 1 supplies the power for the mechanism, while a portion thereof protruding beyond the motor 11 extends through an intermediate gear 4 to engage with the driving gear A. A portion of the rotary shaft 12 protruding beyond the top of the driving gear A is fitted with a shaft seat 2. The balance spring 22 is connected beside the shaft seat 2. A reel 21 is disposed on the top of the shaft seat 2, protruding beyond the top of the main body 1, serving as a displacement control shaft. On one side of the shaft seat 2, the driven gear B meshing with the driving gear A is pivotably connected with a spindle, and a lower portion of the driven gear B meshes with the intermediate gear 4. The lateral side of the intermediate gear 4 contacts with a loading device composed of a meshing tooth disk 31 and a centrifugal mechanism 32 producing rotation resistance by means of centrifugal effect.

According to the above arrangement, the rotary shaft 12 of motor 11 directly drives only the driving gear A. Shaft 12 is free to rotate with respect to shaft seat 2, and intermediate gear 4 is free to rotate with respect to shaft 12. Rotation of gears A and B in response to rotation of shaft 12 causes shaft seat 2 to pivot around the axis of shaft 12. Shaft seat 2 therefore functions in the same manner as link C of FIG. 1C. However, driven gear B also drives gear 4, which places a load on gear B to vary the amount by which shaft seat 2 is pivoted. After the motor 11 is powered on, the rotary shaft 12 drives the driving gear A to rotate and then the driven gear B is driven to rotate. The rotation force of the driven gear B is then transferred to the intermediate gear 4 and loading device 3. Comparing FIG. 2 with FIGS. 1A, 1B, and 1C, the shaft seat 2 is like the link C in FIGS. 1A through 1C and the intermediate gear 4 meshing with the driven gear B and the loading device 3 constitute the load of the driven B. The centrifugal mechanism 32 of the loading device 3 provides the driven gear B with dynamic load. When the rotary speed of the motor 11 changed, the rotary speed of the rotary shaft 12 changes, accordingly. The dynamic resistance changes following the change of centrifugal force of the centrifugal mechanism 32 (providing frictional accessory a′, b′ with frictional normal force). The value thereof is in proportional to the square of rotary speed of the motor. According to the above-mentioned working principle, when the rotary speed of the motor is increased, a larger deflection magnitude of the shaft seat 2 is produced. Thereby, the reel 21 of the shaft seat 2 can serve as a rotary shaft for driving or carrying other elements and controlling the movement thereof.

The above mechanism can be actually applied to the steering control of the toy car. The reel 21 serves as a steering linkage mechanism. Through an adjustable resistor, the rotary speed can be properly changed to control the steering function of the toy car. At the same time, the motor is kept rotated to provide the toy car with forwarding/backing power. As to the sensibility of steering, it can be enhanced by adjusting the resilient coefficient of the spring and the dynamic load of the driven gear so that the steering can be achieved with minor change of rotary speed.

As a result of repeated experiments on the samples to be manufactured based on the above features, it is proved that the structure of the present invention is simple and convenient in use, and it provides a user with various applications, especially on a situation that different rotary speed requirements, different kinds of movement are desired to be done.

The present invention is now described with reference to the embodiment hereof. However, it should be noted that it is in no way limited to the disclosure of such preferred embodiment and the scope of the invention is only defined by the appended claims.

What is claimed is:

1. A displacement control motor comprising:
   a driving gear;
   a driven gear;
   means for mounting the driven gear to mesh with and rotate in response to rotation of said driving gear;
   a shaft seat;
   means for connecting the shaft seat and the driving gear to enable the driving gear to rotate relative to the shaft seat and to enable the shaft seat to pivot through a deflection angle about an axis of rotation of the driving gear;
   means for connecting the driven gear and the shaft seat to enable the driven gear to rotate relative to the shaft seat such that rotation of the driven gear in response to rotation of the driving gear causes the shaft seat to pivot about said axis of rotation of the driving gear; and
   a balance spring mounted to said shaft seat adjacent said means for connecting the driven gear and the shaft seat,
   wherein a value of the deflection angle of said shaft seat about said axis of rotation of said driving gear is a function of a load on the motor and a rotation speed of the motor.

2. A displacement control motor as claimed in claim 1, further comprising means for varying the load on the motor, said load varying means including means for transmitting power to a load device through an intermediate gear meshing with said driven gear.

3. A displacement control motor as claimed in claim 2, wherein said load device comprises a meshing tooth disc and means for mounting the meshing tooth disc to rotate in response to rotation of the intermediate gear and a centrifugal mechanism.

* * * * *